(12) United States Patent
Dürr et al.

(10) Patent No.: US 10,421,228 B2
(45) Date of Patent: Sep. 24, 2019

(54) BETA-ALUMINUM OXIDE CERAMICS OBTAINABLE BY EXTRUSION OF A MIXTURE THAT CONTAINS A SODIUM COMPOUND

(71) Applicant: BASF SE, Ludwigshafen (DE)

(72) Inventors: Anna K. Dürr, Ludwigshafen (DE); Günther Huber, Ludwigshafen (DE); Christian Eichholz, Mannheim (DE); Katrin Freitag, Sao Paulo (BR); Stefan Meuer, Worms (DE)

(73) Assignee: BASF SE, Ludwigshafen am Rhein (DE)

( * ) Notice: Subject to any disclaimer, the term of this patent is extended or adjusted under 35 U.S.C. 154(b) by 40 days.

(21) Appl. No.: 15/021,450

(22) PCT Filed: Sep. 3, 2014

(86) PCT No.: PCT/EP2014/068671
§ 371 (c)(1),
(2) Date: Mar. 11, 2016

(87) PCT Pub. No.: WO2015/036291
PCT Pub. Date: Mar. 19, 2015

(65) Prior Publication Data
US 2016/0221242 A1    Aug. 4, 2016

(30) Foreign Application Priority Data
Sep. 12, 2013   (EP) ..................................... 13184112

(51) Int. Cl.
| | | |
|---|---|---|
| *C04B 35/111* | (2006.01) | |
| *B28B 3/20* | (2006.01) | |
| *C04B 35/626* | (2006.01) | |
| *C04B 35/63* | (2006.01) | |
| *B29C 48/00* | (2019.01) | |
| *C04B 35/113* | (2006.01) | |
| *C04B 35/634* | (2006.01) | |
| *C04B 35/636* | (2006.01) | |
| *B29C 48/92* | (2019.01) | |

(52) U.S. Cl.
CPC .............. *B29C 48/022* (2019.02); *B28B 3/20* (2013.01); *B29C 48/92* (2019.02); *C04B 35/113* (2013.01); *C04B 35/6261* (2013.01); *C04B 35/634* (2013.01); *C04B 35/6365* (2013.01); *C04B 35/63444* (2013.01); *C04B 2235/3203* (2013.01); *C04B 2235/3206* (2013.01); *C04B 2235/3244* (2013.01); *C04B 2235/44* (2013.01); *C04B 2235/442* (2013.01); *C04B 2235/443* (2013.01); *C04B 2235/449* (2013.01); *C04B 2235/6021* (2013.01)

(58) Field of Classification Search
CPC . C04B 35/113; C04B 35/6261; C04B 35/634; C04B 35/63444; C04B 35/6365; C04B 35/10; C04B 2235/44; C04B 2235/442; C04B 2235/443; C04B 2235/49; B28B 21/52; B28B 3/20
USPC ......................................................... 264/618
See application file for complete search history.

(56) References Cited

U.S. PATENT DOCUMENTS

| | | | | |
|---|---|---|---|---|
| 1,925,058 | A | * | 8/1933 | Rowland .................. C04B 33/13 106/484 |
| 4,020,134 | A | | 4/1977 | Gordon et al. |
| 4,113,928 | A | * | 9/1978 | Virkar ....................... C01F 7/02 264/6 |
| 4,797,269 | A | | 1/1989 | Bauer et al. |
| 5,691,082 | A | * | 11/1997 | Kajita ............... H01M 10/3918 423/119 |
| 9,379,421 | B2 | | 6/2016 | Garsuch et al. |
| 2004/0247973 | A1 | * | 12/2004 | Sammes .................. C04B 35/01 429/489 |
| 2009/0075811 | A1 | * | 3/2009 | Namba .................... C04B 35/44 501/153 |
| 2013/0072373 | A1 | * | 3/2013 | Pujol ..................... C04B 35/111 501/135 |
| 2013/0330634 | A1 | | 12/2013 | Huber et al. |
| 2014/0030577 | A1 | | 1/2014 | Huber et al. |

FOREIGN PATENT DOCUMENTS

| | | |
|---|---|---|
| CA | 2176198 A1 | 11/1996 |
| CN | 101462868 A | 6/2009 |
| CN | 101747025 A | 6/2010 |
| CN | 101898894 A | 12/2010 |
| EP | 0 074 274 A2 | 3/1983 |
| EP | 0675558 A1 | 10/1995 |
| EP | 00742274 A1 | 11/1996 |
| JP | H0834664 A | 2/1996 |
| JP | H0834665 A | 2/1996 |

OTHER PUBLICATIONS

Lukasiewicz, Stanley J. "Spray-Drying Ceramic Powders." Journal of the American Ceramic Society, vol. 72, Issue, pp. 617-624 4 (1989). (Year: 1989).*

(Continued)

*Primary Examiner* — Erin Snelting
(74) *Attorney, Agent, or Firm* — Drinker Biddle & Reath LLP

(57) ABSTRACT

Use of a composition comprising
A) from 55 to 90% by weight of aluminum oxide,
B) from 5 to 35% by weight of a sodium compound which at a pH of 7 at 20° C. has a solubility in water of ≤300 g/l and can be converted by thermal means virtually exclusively into sodium oxide as only solid,
C) from 0 to 15% by weight of a magnesium compound and/or a lithium compound selected from the group consisting of: magnesium oxide, magnesium carbonate, magnesium nitrate, lithium oxide, lithium carbonate, lithium nitrate and
D) from 0 to 30% by weight of zirconium dioxide
for producing a shaped ceramic body by extrusion.

14 Claims, No Drawings

(56) References Cited

OTHER PUBLICATIONS

International Search Report for PCT/EP2014/068671 dated Nov. 5, 2014.
"Aluminium Oxide", Punkt 1.3, Ultmann's Encyclopedia of Industrial Chemistry, 2000, vol. 6, pp. 613.
English Translation of International Preliminary Report on Patentability for international application No. PCT/EP2014/068671, dated Feb. 16, 2016.
Sudworth, J.L., et al., "The Sodium Sulfur Battery", 1985, pp. 19-79.
Chinese Office Action with English Translation for Chinese Application No. 201480049162.2, dated Jul. 11, 2017.

\* cited by examiner

BETA-ALUMINUM OXIDE CERAMICS OBTAINABLE BY EXTRUSION OF A MIXTURE THAT CONTAINS A SODIUM COMPOUND

CROSS-REFERENCE TO RELATED APPLICATIONS

This application is a national stage application (under 35 U.S.C. § 371) of PCT/EP2014/068671, filed Sep. 3, 2014, which claims benefit of European Application No. 13184112.4, filed Sep. 12, 2013, both of which are incorporated herein by reference in their entirety.

The present invention relates to the use of a composition comprising aluminum oxide and a sodium compound for producing a shaped ceramic body, a process for producing shaped ceramic bodies and also a moldable composition, in each case as defined in the claims.

Sodium-comprising aluminum oxide, also referred to as sodium aluminate, is known. In technical circles and the literature, it is also referred to as β-aluminum oxide or β-$Al_2O_3$, see, for example, Ullmann's Encyclopedia of Industrial Chemistry, 6th edition, 2000 Electronic Release, Wiley, keyword "Aluminum Oxides", point 1.6. The molar ratio of $Na_2O:Al_2O_3$ in sodium aluminate is usually in the range from 1:1 to 1:11.

The term β-aluminum oxide is in technical circles and the literature used for, in particular, sodium aluminates which have a hexagonal crystal structure, ideally of the space group $P6_3$/mmc.

However, sodium aluminate having a hexagonal crystal structure ideally of the space group R/3m is referred to as β"-aluminum oxide.

In the following, the term "beta-aluminum oxide" is used to encompass both β-aluminum oxide and β"-aluminum oxide, with the latter being preferred. Furthermore, the term beta-aluminum oxide used here is intended to encompass any mixtures or phase mixtures of β-aluminum oxide and β"-aluminum oxide, preferably those in which the proportion of β"-aluminum oxide is greater than 90% by weight, particularly preferably greater than 95% by weight.

Shaped bodies composed of beta-aluminum oxide are frequently used as sodium ion-conducting solid electrolytes, for example in an electrochemical sodium-sulfur cell (also referred to as "NaS battery" by those skilled in the art), a sodium/nickel chloride cell (also referred to as "zebra battery") or in the electrochemical preparation of elemental sodium.

Such shaped bodies composed of beta-aluminum oxide are usually produced according to the following scheme, as described, for example, in EP 0 074 274 A2:

Mixing of the sodium component, for example sodium carbonate, α-aluminum oxide and possibly further components, thermal treatment of the mixture (also referred to as "calcination") to form sodium aluminate, production of a moldable composition from this sodium aluminate, shaping, for example by isostatic pressing or extrusion, optionally further thermal treatment of the shaped body.

In the interest of process economics, it is desirable to produce the moldable composition directly from the sodium component, aluminum oxide, for example α-aluminum oxide, γ-aluminum oxide, and optionally further components, i.e. without calcining this mixture beforehand.

JP 08-034664 A (NGK Insulators Inc.) describes, in example 2, a process for producing a β-aluminum oxide solid electrolyte, in which α-aluminum oxide powder, sodium oxalate, magnesium oxide are suspended, milled and spray-dried to form granules and the granules are converted by isostatic pressing into shaped parts and the latter are fired at a maximum of 1600° C. to produce sintered β-aluminum oxide bodies.

JP 08-034664 A does not disclose extrusion as shaping process.

EP 0 074 274 A (Ford Motor Company Limited) discloses the extrusion of a β"-aluminum oxide precursor which has been obtained by calcination of sodium carbonate, lithium nitrate and a particular α-aluminum oxide (example 21(a) ff).

EP 0 074 274 A describes neither the extrusion of an uncalcined precursor nor the use of sodium oxalate.

It was an object of the present invention to remedy the disadvantages of the prior art and to provide a simple process or a moldable composition for producing shaped ceramic bodies by means of extrusion.

The object has been achieved by the process defined in the claims and the use and moldable composition defined in the claims.

The composition of the invention comprises, as component A), from 55 to 90% by weight, preferably from 70 to 80% by weight, particularly preferably from 72 to 78% by weight, of aluminum oxide, preferably α-aluminum oxide, in each case based on the sum of the components A) to D). Aluminum oxide is known. α-Aluminum oxide is marketed, for example, under the trade name Nabalox® by Nabaltec.

The particle size of the aluminum oxide of the component A), preferably α-aluminum oxide, is usually in the range from 0.1 to 5 μm, preferably in the range from 0.5 μm to 1.5 μm.

As component B), the composition of the invention comprises a sodium compound which at a pH of 7 at 20° C. has a solubility in water of ≤300 g/l (in words: 300 grams or less) and can be converted by thermal means, preferably in the presence of oxygen, virtually exclusively into sodium oxide as only solid, preferably at a temperature in the range from 1200 to 1700° C., and preferably without corrosive or other undesirable by-products, for example nitrogen oxides, halogens such as fluorine, chlorine, carbon-rich deposits such as soot, being formed. The component B) includes sodium oxide as such.

The solubility of the sodium compound of component B) in water at 20° C. and a pH of 7 is in the range from 0 g/l, preferably 0.0001 g/l to 300 g/l inclusive, preferably in the range from 0.0001 g/l to 300 g/l inclusive.

As component B), the composition of the invention preferably comprises a sodium compound selected from the group consisting of: sodium oxalate, sodium carbonate, sodium hydrogencarbonate, sodium acetate, sodium cyanate.

A particularly preferred sodium compound B) is sodium oxalate with or without water of crystallization. The amounts of sodium oxalate indicated are here based on the pure material, i.e., for example, without water of crystallization.

The amount of the component B), preferably of sodium oxalate without water of crystallization, based on the sum of the components A) to D), is in the range from 5 to 35% by weight, preferably in the range from 15 to 30% by weight.

Sodium oxalate is known and commercially available. However, for the use according to the invention, it can be prepared in situ, for example from oxalic acid and the stoichiometric amount of sodium hydroxide, preferably aqueous sodium hydroxide solution.

As component C), the composition of the invention can comprise from 0 to 15% by weight, preferably from 0.5 to 9% by weight, based on the sum of the components A) to D), of a magnesium compound and/or a lithium compound selected from the group consisting of: magnesium oxide, magnesium carbonate, magnesium nitrate, lithium oxide, lithium carbonate, lithium nitrate.

In one embodiment, the component C) comprises either a magnesium compound as defined above, preferably magnesium oxide, or a lithium compound as defined above, preferably lithium oxide, in each case in the amounts defined for the component C).

The composition of the invention can comprise, as component D), from 0 to 30% by weight, preferably from 0.2 to 5% by weight, of zirconium dioxide ($ZrO_2$), which can, for example, be stabilized with yttrium ions and/or magnesium ions.

In a preferred embodiment, the composition of the invention comprises zirconium dioxide ($ZrO_2$), preferably zirconium dioxide ($ZrO_2$) stabilized with yttrium ions, as component D), in each case in the amounts defined for the component D).

Zirconium dioxide ($ZrO_2$), including zirconium dioxide stabilized with yttrium ions, is known and commercially available.

The sum of the components A) to D) is 100% by weight.

The composition of the invention is used for producing a shaped ceramic body, preferably a ceramic which conducts sodium ions. For this purpose, the composition of the invention is usually suspended, optionally with addition of additives, in a suspension medium, usually water and/or alcohols such as $C_1$-$C_8$-alcohols, for example ethanol, n-propanol, i-propanol, cyclohexanol, preferably water.

The amount of the composition A) to D) according to the invention, based on said suspension, is generally in the range from 20 to 60% by weight, preferably in the range from 40 to 50% by weight.

The suspension obtained can then be processed further directly to give the moldable composition.

In a further embodiment, the suspension obtained can be milled, preferably in a ball mill, with the composition after milling preferably having a narrow particle size distribution $D_{50}$ in the range from 0.5 to 1.5 µm (microns), preferably about 1 µm. The particle size distribution is measured, for example, by means of the particle size measuring instrument Mastersizer 2000 from Malvern Instruments Ltd. or Malvern Instruments GmbH. The Mastersizer 2000 instrument measures the size of particles by laser light scattering. Here, the intensity of the scattered light of a laser beam is measured while it passes through a dispersed particle sample. From these data, the size of the particles is then calculated from the scattering pattern produced.

Preferably when the composition of the invention has been suspended and milled as described above, the resulting suspension is usually dried by conventional drying processes, preferably by spray drying, optionally with addition of a binder and/or other additives, and is then usually in the form of a pulverulent or preferably granular solid.

The pulverulant or preferably granular solid obtained in this way is usually suspended in a suspension medium, generally water and/or alcohols such as $C_1$-$C_8$-alcohols, for example ethanol, n-propanol, i-propanol, cyclohexanol, preferably water, generally with addition of particular "binder systems" which usually make the resulting mixture (also referred to as "batch" in technical circles) kneadable and extrudible.

For the present purposes, binder systems are chemical compounds and/or compositions which convert the composition comprising the components A) to D), usually in the above-described suspension, into a kneadable and extrudible composition.

Well-suited binder systems comprise oligomeric and/or polymeric chemical compounds which comprise monomer units comprising a heteroatom or a plurality of heteroatoms in the monomer unit as homomonomer or comonomer, where the heteroatoms are selected from the group consisting of nitrogen, oxygen and sulfur. Examples of such oligomeric and/or polymeric chemical compounds are polyvinylpyrrolidone, polyethylene glycol, cellulose derivates.

Further compositions which can be used as binder system are described, for example, in EP 0 074 274 A2, especially on page 9, line 17 to page 15, line 6.

Very well-suited binder systems are those which are not "salted out" by the component B), preferably sodium oxalate, which means that the binder is not partially or completely precipitated, usually with formation of a readily flowing often greasy composition which is not kneadable, on mixing of the binder system with the component B) according to the invention in the presence or even in the absence of further components A) and/or C) and/or D) according to the invention in a suspension medium as described above, but instead a kneadable and extrudible composition is formed.

The amount of the composition A) to D) according to the invention in solid form, based on the complete, above-described suspension is usually selected so that a moldable, preferably kneadable composition is formed and is, for example, in the range from 10 to 60% by weight, preferably from 20 to 50% by weight.

The above-described, moldable, preferably kneadable composition is then converted by means of the extrusion process into a shaped body. The shaped bodies can have a variety of geometries, for example polygonal, flat bodies or solid rods having a polygonal or round or oval cross-sectional geometry or long hollow bodies having any cross-sectional geometry, for example rectangular, square, polygonal, oval, round and can be open at both ends or closed at one or both ends.

Well-suited shaped bodies are, for example, rods of any cross-sectional geometry, for example rectangular, square, polygonal, oval, round, with preference being given to the rods having a cylindrical geometry; preference is also given to shaped bodies in the form of long hollow bodies of any cross-sectional geometry, for example rectangular, square, polygonal, oval, round, particularly preferably cylindrical tubes which can be open at both ends or closed at one or both ends.

Very particular preference is given to cylindrical tubes closed at one end as shaped bodies.

The above-described shaped bodies obtained by extrusion are referred to as "green bodies" in the specialist field, and in places here, too.

Suitable extrusion processes for obtaining a shaped body or green body as described above are known and are described, for example, in EP 0 074 274 A2.

In simplified language, the above-described moldable, preferably kneadable composition is extruded in a commercial extruder equipped with a die for the desired geometry of the shaped body, for example a round slit die.

The above-described green body obtained by extrusion of the composition of the invention, hereinafter also referred to as "green body according to the invention", is usually dried using known methods, for example on a roller drier at temperatures in the range from 15 to 60° C., preferably from 20 to 35° C., and then treated thermally at a temperature in the range from 1200° C. to 1700° C., preferably in the range from 1500 to 1650° C., preferably in the presence of oxygen, for example air, and preferably encapsulated in a sintering aid.

According to the present state of knowledge, the abovementioned green body according to the invention changes over during the abovementioned thermal treatment into a shaped ceramic body with formation of the desired beta-aluminum oxide, preferably β"-aluminum oxide.

This shaped beta-aluminum oxide body, preferably shaped β"-aluminum oxide body, or else ceramic shaped body is preferably a ceramic capable of conducting sodium ions, as described, for example, in J. L. Sudworth, R. H. Tilley, The Sodium Sulfur Battery, Chapman and Hall Ltd. 1985, ISBN 0 412 16490 6, pages 19 to 79.

The present application also provides a process for producing shaped ceramic bodies, wherein
i) from 55 to 90% by weight of aluminum oxide as component A),
ii) from 5 to 35% by weight of a sodium compound which at a pH of 7 and 20° C. has a solubility in water of ≤300 WI and can be converted by thermal means virtually exclusively into sodium oxide as only solid as component B),
iii) from 0 to 15% by weight of a magnesium compound and/or a lithium compound selected from the group consisting of: magnesium oxide, magnesium carbonate, magnesium nitrate, lithium oxide, lithium carbonate, lithium nitrate as component C), and
iv) from 0 to 30% by weight of zirconium dioxide as component D) are mixed with water and/or alcohols to give a suspension, optionally
v) the composition from step iv) is milled, optionally
vii) dried and
viii) converted by combining with a suspension medium, a binder and optionally other additives into a moldable composition,
ix) the latter is extruded and
x) treated thermally in the temperature range from 1200° C. to 1700° C.

With regard to the components A) to D), the amounts thereof and all further features of the above-described process, what has been stated herein applies expressly.

The present application also provides a moldable composition which is suitable for producing shaped ceramic bodies, preferably ceramics capable of conducting sodium ions, preferably in the form of cylinders closed at one end, wherein the moldable composition is obtainable as described above under i) to viii) inclusive of all embodiments. With regard to the components A) to D), what has been stated herein expressly applies in respect of the moldable composition.

The inventive composition comprising the components A) to D), preferably the moldable composition as described above, has the advantages that it leads to virtually no "effluence" of the sodium component, here component B), on the surface of the green bodies according to the invention, has the "correct" consistency, namely sufficient toughness for extrusion, the component B) leaves virtually no residues apart from sodium oxide after the thermal treatment and the component B) prevents binder systems from precipitating from the suspension.

EXAMPLES

Luvitec®K90 is a registered trademark of BASF SE. The product is a vinylpyrrolidone homopolymer having a molar mass Mw of about 1400 kDa and a molar mass Mn of about 325 kDa. Further information on the product may be found in the brochure "PVP and more . . . LUVITEC®, LUVICROSS® und COLLACRAL®VAL—Spezialpolymere für technische Anwendungen" (version of January 2010) of BASF SE.

Methocel™ K4M Premium is a trademark of DowWolff Cellulosics. The product is a methyl ester of cellulose, also known as additive E 461.

Comparison of sodium formate and sodium oxalate with polyvinylpyrrolidone (Luvitec® K90) in water.

Example C1 (for Comparison)

18 g of sodium formate were slowly added while stirring to 50 g of a 1% strength by weight solution of Luvitec® K90 in water until saturated was reached. Luvitec® K90 precipitated as a greasy precipitant.

Example 1 (According to the Invention)

6.8 g of sodium oxalate were slowly added while stirring to 50 g of a 1% strength by weight solution of Luvitec® K90 in water. No greasy precipitate was formed and insoluble sodium oxalate settled at the bottom of the vessel.

Comparison of sodium formate and sodium oxalate with methyl cellulose (Methocel™ K4M Premium from DowWolff Cellulosics) in water.

Example C2 (for Comparison)

6.8 g of sodium formate were slowly added while stirring to 50 g of a 1% strength by weight solution of Methocel™ K4M Premium in water until saturation was reached. Foaming occurred.

Example 2 (According to the Invention)

6.8 g of sodium oxalate were slowly added while stirring to 50 g of a 1% strength by weight solution of Methocel™ K4M Premium in water. No foaming occurred and insoluble sodium oxalate settled at the bottom of the vessel.

The examples and comparison examples show that sodium salts which are readily soluble in water (sodium formate) lead to precipitation or salting-out of the binder systems, in contrast to sodium salts which are sparingly soluble in water (sodium oxalate).

The invention claimed is:
1. A process for producing a shaped ceramic body, comprising:
A. mixing a composition comprising
i) from 55 to 90% by weight of aluminum oxide as component A),
ii) from 5 to 35% by weight of a sodium compound which at a pH of 7 and 20° C. has a solubility in water of ≤300 g/l and can be converted by thermal means virtually exclusively into sodium oxide as only solid as component B),
iii) from 0 to 15% by weight of a magnesium compound and/or a lithium compound selected from the group consisting of: magnesium oxide, magnesium carbonate, magnesium nitrate, lithium oxide, lithium carbonate, lithium nitrate as component C),
and
iv) from 0 to 30% by weight of zirconium dioxide as component D)
with water and/or alcohols to give a suspension,
B. milling the suspension in a ball mill,
C. drying the suspension,

D. converting the dried suspension into a moldable composition by combining with water, a binder and optionally other additives, E. extruding the moldable composition, and F. thermally treating the extruded moldable composition in the temperature range from 1200° C. to 1700° C.;

wherein the composition after milling has a particle size distribution $D_{50}$ in the range from 0.5 to 1.5 microns;

wherein the amount of the composition of i) to iv) is from 20 to 50% by weight, based on the moldable composition.

2. The process according to claim 1, wherein the shaped ceramic body is a ceramic capable of conducting sodium ions.

3. The process according to claim 1, wherein the sodium compound of the component B) is selected from the group consisting of: sodium oxalate, sodium carbonate, sodium hydrogencarbonate, sodium acetate, and sodium cyanate.

4. The process according to claim 1, wherein at least some magnesium compound or a lithium compound is used in iii).

5. The process according to claim 1, wherein sodium oxalate is used in ii).

6. A moldable composition which is suitable for producing shaped ceramic bodies and is obtained by a process comprising:

A. mixing a composition comprising i) from 55 to 90% by weight of aluminum oxide as component A), ii) from 5 to 35% by weight of a sodium compound which at a pH of 7 and 20° C. has a solubility in water of ≤300 g/l and can be converted by thermal means virtually exclusively into sodium oxide as only solid as component B), iii) from 0 to 15% by weight of a magnesium compound and/or a lithium compound selected from the group consisting of: magnesium oxide, magnesium carbonate, magnesium nitrate, lithium oxide, lithium carbonate, lithium nitrate as component C), and iv) from 0 to 30% by weight of zirconium dioxide as component D)

with water and/or alcohols to give a suspension,

B. milling the suspension in a ball mill,

C. drying the suspension,

D. converting by combining with water, a binder and optionally other additives into the moldable composition, and wherein the amount of the composition of i) to iv) is from 20 to 50% by weight, based on the moldable composition;

wherein the composition after milling has a particle size distribution $D_{50}$ in the range from 0.5 to 1.5 microns.

7. The moldable composition according to claim 6, wherein the sodium compound of the component B) is selected from the group consisting of: sodium oxalate, sodium carbonate, sodium hydrogencarbonate, sodium acetate, and sodium cyanate.

8. The moldable composition according to claim 6, wherein at least some magnesium compound or a lithium compound is used in iii).

9. The moldable composition according to claim 6, wherein sodium oxalate is used in ii).

10. A process for producing a shaped ceramic body comprising mixing a composition comprising A) from 55 to 90% by weight of aluminum oxide, B) from 5 to 35% by weight of a sodium compound which at a pH of 7 at 20° C. has a solubility in water of ≤300 g/l and can be converted by thermal means virtually exclusively into sodium oxide as only solid, C) from 0 to 15% by weight of a magnesium compound and/or a lithium compound selected from the group consisting of: magnesium oxide, magnesium carbonate, magnesium nitrate, lithium oxide, lithium carbonate, lithium nitrate and D) from 0 to 30% by weight of zirconium dioxide, with a suspension medium to give a suspension;

milling the suspension in a ball mill;

drying the suspension;

converting the dried suspension into a moldable composition by combining with water, a binder and optionally other additives; and extruding the moldable composition;

wherein the moldable composition is not calcined before extrusion;

wherein the amount of A) to D) in the moldable composition, based on the moldable composition, is in the range from 20 to 50% by weight; and wherein the composition after milling has a particle size distribution $D_{50}$ in the range from 0.5 to 1.5 microns.

11. The process according to claim 10, wherein the sodium compound of the component B) is selected from the group consisting of: sodium oxalate, sodium carbonate, sodium hydrogencarbonate, sodium acetate, and sodium cyanate.

12. The process according to claim 10, wherein the shaped ceramic body is a ceramic capable of conducting sodium ions.

13. The process according to claim 10, wherein at least some magnesium compound or a lithium compound is used in C).

14. The process according to claim 10, wherein sodium oxalate is used in B).

* * * * *